Aug. 16, 1960           C. REYKJALIN           2,949,175
CLUTCH MECHANISM AND LUBRICANT THEREFOR
Filed April 11, 1955           2 Sheets-Sheet 1
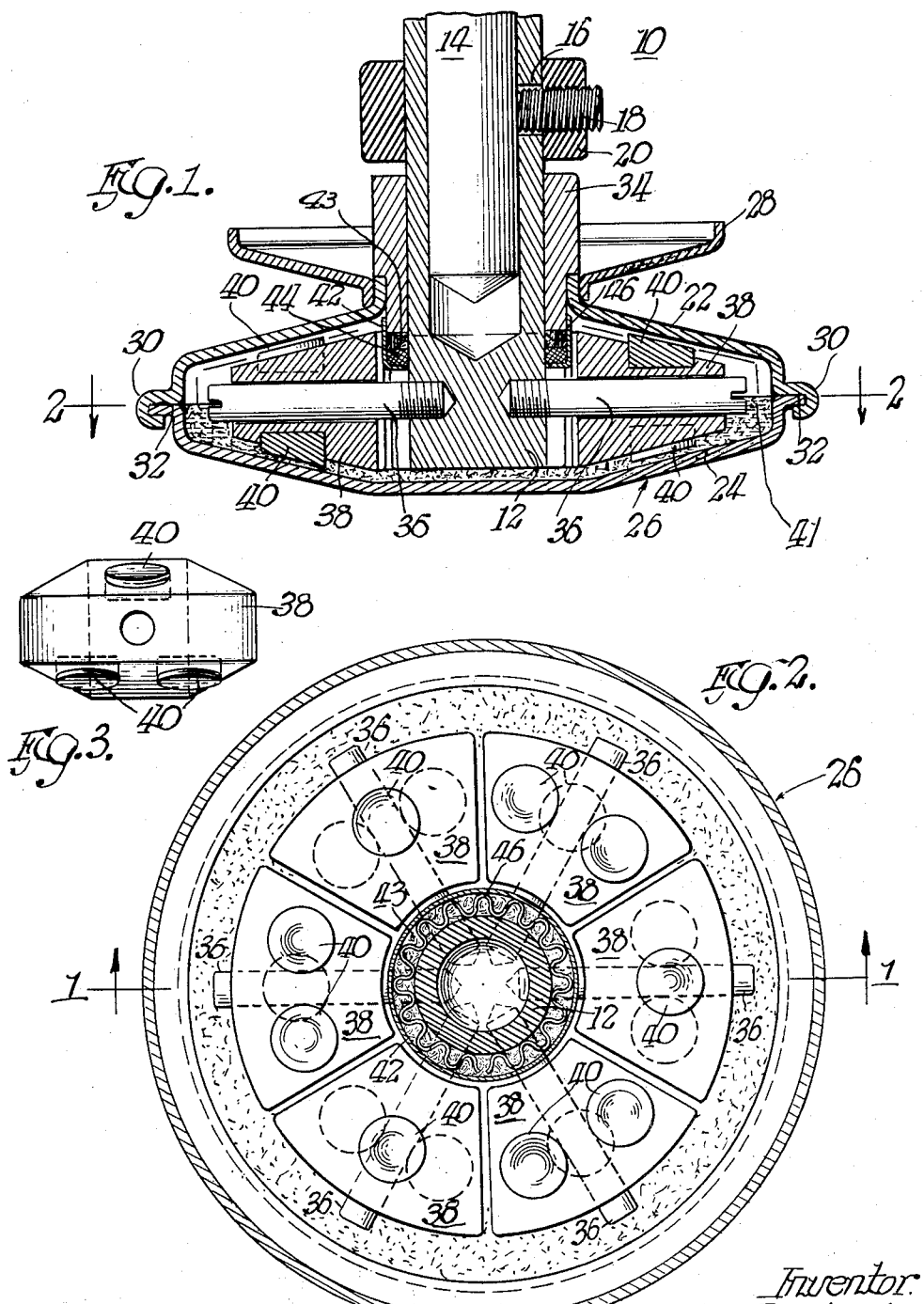
Inventor:
Charles Reykjalin
By: Thiess, Olson, Mecklenburger, van Holst, & Coltman Attys.

United States Patent Office 2,949,175
Patented Aug. 16, 1960

2,949,175

CLUTCH MECHANISM AND LUBRICANT THEREFOR

Charles Reykjalin, Melrose Park, Ill., assignor, by mesne assignments, to Koren Research & Engineering Company, Chicago, Ill., a corporation of Illinois Filed Apr. 11, 1955, Ser. No. 500,511

8 Claims. (Cl. 192—113)

This invention relates to an improved coupling apparatus, and, more particularly, pertains to a clutch utilizing a novel dry lubricant whereby two rotatable coupling elements may be consistently coupled within predetermined limits of speed and torque.

Various devices have heretofore been proposed which couple a rotary drive shaft to a rotatable load. However, the decoupling and coupling operations of the shaft and load have been fraught with difficulty owing to the inconsistent manner in which the decoupling and coupling actions are effected at varying speeds and torques. If decoupling of the drive shaft and rotatable load is not effected above a predetermined maximum overload torque, permanent damage to the motive means may result. Conversely, if a coupling of the drive shaft and rotatable load is effected under a predetermined minimum speed, the drive shaft will have insufficient inertia to rotate the load.

It is an object of this invention, therefore, to provide an improved coupling device which will consistently decouple above a predetermined maximum torque and which will consistently couple above a predetermined minimum speed.

It is a further object of this invention to provide a dry lubricant which is in fact a finely comminuted friction controlling material for use with a coupling device which assures uniformity of the coupling and decoupling operations by assuring a constant and desirable coefficient of friction between the coupling members. The term "dry," as used in this application, is intended to mean other than liquid, and does not necessarily require that the lubricant be completely free of all entrapped moisture, oil or similar fluids.

It is a still further object of this invention to provide an improved rotary shaft seal especially useful for retention of a dry lubricant within a rotatable housing.

It is another object of this invention to provide an improved coupling device utilizing a novel friction means arrangement which minimizes and renders more uniform any wear of the friction means, thereby adding to the life of the coupling device.

Further and additional objects of this invention will become manifest from an examination of this specification, the accompanying drawings, and the appended claims.

In one form of the invention, a centrifugal clutch is provided which contains a dry lubricant of specified composition. The lubricant assures consistent coupling and decoupling of a rotatable shaft, comprising the driving means, and a wedge-shaped housing, comprising the driven means, within a specified range of speed and torque, thereby obviating undue strain or damage to an associated motive means. The rotatable shaft is journalled in a bearing interposed between the rotatable shaft and the wedge-shaped housing. The rotatable shaft drives a plurality of radially movable wedge-shaped clutch elements which impart the rotary movement of the motive means to the wedge-shaped housing in which the clutch elements are positioned. The dry lubricant is freely contained within the housing and is partially interposed between the clutch elements and the housing surfaces, thus assuring a constant coefficient of friction therebetween under all conditions of operation. A novel seal utilizing an entrapped grease prevents lubricant from entering the rotatable shaft-bearing interface in the normal course of operation, thereby maintaining the interface in a clean condition and assuring consistency of operation.

For a more complete understanding of this invention, reference will now be made to the accompanying drawings, wherein:

Figure 1 is an axial view, partly in section, of one embodiment of this invention;

Fig. 2 is a transverse sectional view of the embodiment of Figure 1 taken on line 2—2;

Fig. 3 is an end perspective view of one of the fly weights utilized in the illustrated apparatus;

Figure 4:
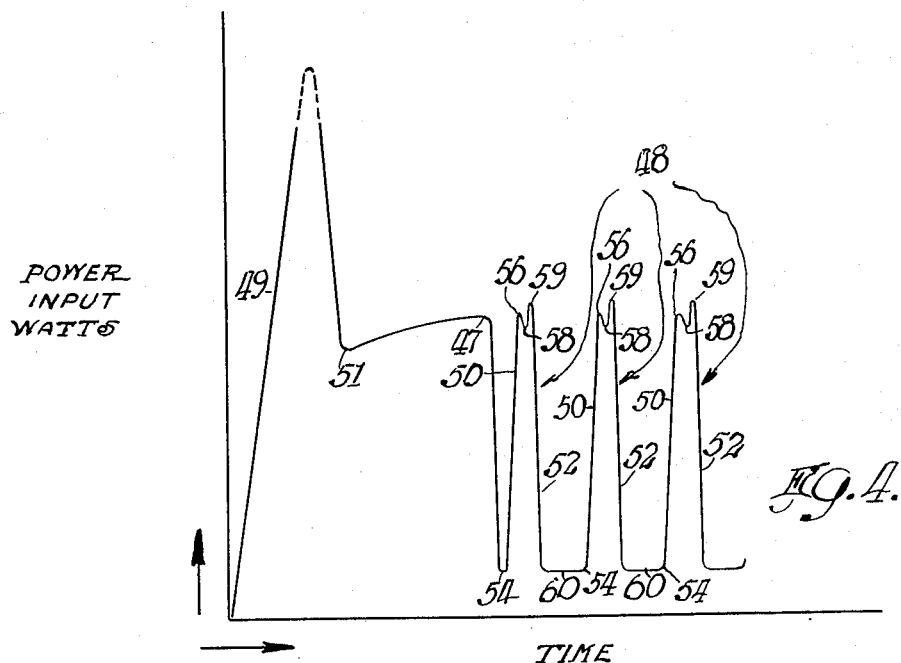
Fig. 4 is an idealized graph of a number of periodic braking and release cycles of the illustrated apparatus, in which the input power is plotted against time.

Referring now to the drawings and, more particularly, to Figure 1, a coupling device 10 is illustrated which is both speed and torque sensitive and which utilizes a novel dry lubricant, hereinafter to be discussed in greater detail. The coupling device 10 comprises a hollow centrally disposed shaft 12 suitably recessed to engage an output shaft 14 (fragmentarily shown) which is driven by a motive means (not shown). The shaft 12 has an aperture 16 which receives a set screw 18; the set screw 18 threadedly engages a locking collar 20 peripherally disposed about the upper portions of the shaft 12. The set screw 18 fixedly engages shaft 14, and the shaft 12 is thus simultaneously rotated with the output shaft 14.

Two sheet metal elements 22 and 24 form a housing 26 which comprises the driven member. A sheave portion 28 is brazed or otherwise suitably affixed to the upper end portion of the housing element 22 and functions with the upper surface of the housing element 24 to form a pulley. The pulley is adapted to receive and be driven by a belt (not shown) which, in turn, drives a rotatable load (not shown). The housing element 22 has a peripheral lip portion 30, which is crimped over an opposed peripheral flange portion 32 of the housing element 24. A bearing 34 is secured within a central aperture in the housing portion 22 and rotatably engages the central shaft 12. The bearing member may be composed of any of a number of well-known bearing alloys.

A plurality of pins 36 radiate from the central shaft 12 and have disposed thereon fly weights 38. The weights 38 are longitudinally apertured so as to be freely slidable on the pins 36. As will be noted from Fig. 2, the pins form a driving spider which is the driving means for imparting rotational movement to the driven member or housing 26. While six pins and associated fly weights are employed in the illustrated embodiment, any number may be used. Embodiments using two and three weights uniformly disposed about the shaft 12 have been successfully built and tested. Suitably cemented or otherwise attached to each of the weights 38 are friction discs 40 which may be composed of any material having the desired frictional and wear characteristics, although an impregnated fiber construction has been found especially well adapted for this use. The material should be of a film supporting character similar to impregnated fiber to receive and support the films referred to hereinafter.

Referring now to Fig. 3, it will be noted that each of the fly weights 38 has three discs affixed thereto; two of the discs are cemented on one surface and an opposed disc is similarly cemented to the opposed weight surface. Referring again to Fig. 2, it will be noted that the orientations of the weights are alternated whereby the number of discs on an upper or a lower fly weight surface varies with each successive weight, thereby assuring balance during the normal course of operation of the rotating spider and weight assembly. It is apparent that, by positioning three friction discs on each fly weight in the manner shown with the discs on one weight face disposed along two spaced radials of the shaft and the discs on the other weight face disposed on an intermediate radial, maximum surface contact will be effected between the discs and the surfaces of the driven housing member 26. By positioning three discs on each fly weight, the weights may pivot on the singly positioned disc assuring efficient contact between all three disc surfaces and the surfaces of the driven housing. In addition, by enabling maximum surface areas of all three discs to contact the inner surface of the housing 26 equal wear of the friction discs will be effected, thereby adding to the life of the coupling construction.

In the normal course of operation, the output shaft 14 rotatably moves the attached central shaft 12. As the shaft 12 approaches the desired speed, the fly weights 38 slide outwardly by centrifugal force until the friction discs 40 engage the opposed inner surfaces of the driven housing 26. To provide gradual engagement of the surfaces by the friction discs 40, the housing 26 is approximately half filled with a dry lubricant 41. The lubricant enables the friction discs to slip over the surfaces of the housing 26 with predetermined friction whereby the housing 26 is gradually accelerated up to the speed of the motive means. Extremely high starting torques and consequent motor overloading is thus avoided.

By utilizing a dry lubricant as provided by this invention, a consistent coefficient of friction is assured between the engaged surfaces of the friction discs 40 and the housing 26. In addition, the coefficient of friction during acceleration is substantially higher than that attainable when a liquid lubricant is used. At rated speed, the coefficient remains constant while in a liquid lubricated clutch, the coefficient of friction at rated speed becomes quite high. Consequently, the starting torque available from a coupling constructed in accordance with this invention when driven from a given motive means will substantially exceed that available from a similar fluid lubricated clutch and will remain at a constant value.

The dry lubricant 41 provided in the illustrated embodiment comprises approximately 27.2 percent graphite, 15.6 percent exfoliated vermiculite, 6.3 percent carbon black, and 50.9 percent metal oxide by weight. As before mentioned, the above dry lubricant assures a consistent coefficient of friction, and, consequently, a consistent decoupling torque under all conditions of operation of the illustrated coupling device. One particular graphite which is utilized in the preferred dry lubricant is of —325 mesh. The vermiculite is of similar mesh, having no particle diameter in excess of 0.05 millimeter. The carbon black utilized in the particular embodiment described is sold under the trade name Kosmos F–4 and is manufactured by United Carbon Co. The metal oxide employed is in the form of a fine flour of pigment grade and may be either tin, iron or zirconium oxide, although tin is preferred because of its more consistent characteristics. While tin apparently insures the formation of a stabilized, uniform, thin film of graphite and carbon black on the clutch pads, thus producing consistent and repeating characteristics, zirconium appears to remove the film from the pads, thus giving somewhat erratic operation during subsequent build-up of a film. The use of iron oxide requires a substantially dehydrated atmosphere within the housing.

The graphite component of the dry lubricant functions as a lubricant between the engaging surfaces of the coupling device, and the crystals thereof are prevented from becoming oriented by the addition of carbon black. The vermiculite is exfoliated and functions as a filler and carrying vehicle for the remaining ingredients. The vermiculite also acts to absorb any oil or other fluid impurities which may be present. The metal oxides stabilize a particular film formation on the engaging surfaces of the coupling device, and act as a mild film-disintegrating agglomerant and a torque stabilizer during temperature changes. As was noted above, the particle size of the oxides is extremely small. The tin oxide used in the lubricant described is a compound employed in the polishing of gem stones and has a particle size of the order of 10 microns.

As may be appreciated from the fine particle size of the lubricant ingredients, an effective seal must be interposed between the central shaft 12 and the bearing 34 to prevent the entrance of the dry lubricant into the annular interface therebetween. Upon such an occurrence, the shaft 12 rotating at a high speed will become packed with lubricant and scored, causing eventual freezing and locking of the shaft 12 to the bearing 34.

Referring once more of Fig. 1, it will be noted that the seal comprises a metal seal cap 42 peripherally disposed about the central shaft 12. A felt seal ring 44 is positioned in the annular recess defined by the seal cap and the central shaft 12. A corrugated resilient grease retainer 46 is contiguous with an upper surface of the felt seal ring 44 and peripherally contacts the inner surface of the metal seal cap 42. As will be more clearly noted in Fig. 2, interposed in the corrugations of the grease retainer is a viscous material 43, such as a heavy grease which will readily absorb any of the dry lubricant which may penetrate past the felt seal ring 44. By utilizing this novel seal which is especially useful with the dry lubricant provided by this invention, the danger of any dry lubricant particles entering the annular interface between the central shaft 12 and the bearing 34 is obviated.

As will now be described in greater detail, a novel coupling construction is provided by this invention utilizing a dry lubricant which, owing to its composition, assures a consistent coefficient of friction between the engaging surfaces of the driving and driven means and also enables a higher coefficient of friction to be present therebetween than heretofore had been possible with a liquid lubricant.

The operation of the clutch described above is generally as follows. The driving shaft 12 is connected to the shaft 14 of a motive means such as an induction motor and the output pulley 28 to any load. Upon energization of the induction motor, the shaft 12 and weight assembly begin to rotate and, as is well understood, the accelerating induction motor draws a large starting current to provide the necessary power to overcome the inertia of the system. As the motor and driving spider accelerate and approach running speed, the power consumption of the motor is substantially reduced until the speed is of such a value that the weights 38 are thrown outwardly by centrifugal force to engage the housing 26.

Figure 5:
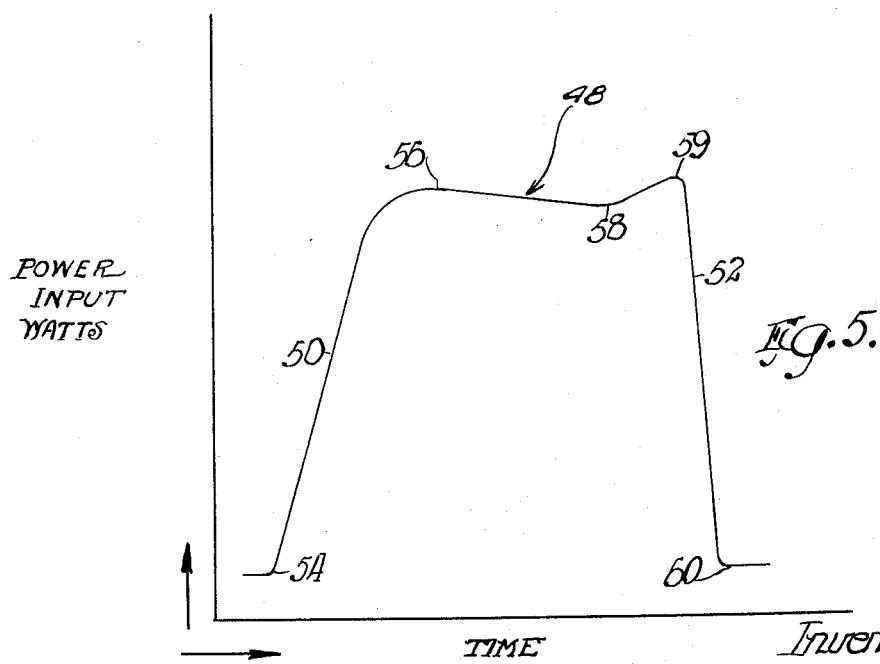
Fig. 5 is an idealized graph of one of the braking and release cycles illustrated in Fig. 4, in which the unit time interval has been substantially reduced.

When the weights 38 engage the housing 26, the housing, pulley and load are accelerated by frictional engagement of the weights with the housing. This acceleration requires increased power consumption by the motor. As the housing and pulley approach rated speed, the power consumption of the motor falls to a minimum steady state value. This value is sufficient to overcome the inertia of the motor armature, the clutch parts, and the friction of the load. If a load is subsequently placed on the clutch output, the power consumption of the motor will rise and the rise in power consumption will be proportional to the output torque provided by the pulley. This output torque and, consequently, the power consumption of the motor will be limited by the torque transmitting characteristics of the frictionally engaged clutch surfaces. For optimum operation, a clutch is provided which will permit the motor and driving spider to accelerate to a speed approaching operating speed before the centrifugal weights engage the housing and will transmit a maximum torque corresponding to the maximum power rating of the associated motor means. In a laboratory test of a motor and clutch assembled in accordance with the teaching of this invention the motor was energized with an inertial load in the form of a flywheel on the clutch output and the clutch permitted to accelerate to operating speed. Thereafter a timing mechanism periodically operated a locking brake which prevented rotation of the clutch housing, pulley and flywheel. A typical plot of power consumption versus time for this operation is illustrated in Figs. 4 and 5 of the drawings. Fig. 4 illustrates the entire operating cycle described above, while Fig. 5 illustrates a portion of Fig. 4 on an expanded time base.

As shown in Fig. 4, the portion 49 of the operating curve represents the rapid increase in power consumption of an induction motor upon initial energization and acceleration of the apparatus. The point 51 on the curve represents the time at which the clutch weights engage the housing, accelerating the output portions of the clutch and the flywheel toward rated speed. The gradual rise in the curve between points 51 and 47 represents the gradual acceleration of the output resulting from the slippage between the friction pads and the housing. At the point 47 the pads and housing are rigidly coupled and approaching operating speed. Therefore, the power consumption drops to the value indicated by point 54' which is that power necessary to operate the motor and clutch with a fixed inertial load. The output pulley is then locked against rotation and the torque applied to the brake, and, consequently, the power consumption in the motor rises very rapidly, as shown by the curve portion 50. At the point 56 on the curve, the clutch parts begin to slip and, as the parts experience relative rotation, the dry lubricant becomes interposed between the relatively rotating, frictionally engaged parts, producing a slightly reduced coefficient of friction and, consequently, slightly lowered torque and lower power consumption. The slight change in power consumption shown in the curve may also be attributable, in part, to a small deformation of the housing resulting from the forces acting thereon. One desideratum of this invention is the maintenance of the torque at a constant value while the output pulley is locked against rotation. At the point 58 on the curve, the locking brake is removed from the pulley, and the housing, pulley, and flywheel once again accelerate to the speed of the motive means. The acceleration of the output portions of the clutch cause an increase in the power consumption of the motor, as indicated by the point 59 on the curve; and, as the parts approach rated speed, the torque requirements of the system and, consequently, the power input to the motor, fall rapidly, as indicated by curve 52, to the minimum value 60. The power consumption remains at this value until the locking brake is once again applied to the output causing a repetition of the cycle 48, above described.

Three such complete cycles 48 are illustrated in Fig. 4, and one of the cycles 48 is shown on an expanded time base in Fig. 5. Therein the manner in which the power consumption varies with the application of an excessive load can be clearly seen. At the point 54 the brake is applied to the output of the clutch, causing the rapid rise 50 in the torque applied to the output and, consequently, in the power input to the motor. As the brake locks and the clutch parts turn relatively, the curve portion 56 indicates a slight decline in the power consumption which corresponds to a reduction in the coefficient of friction due to the effect of the dry lubricant on the frictionally engaged parts. This effect is minimized by this invention. At point 58, as described above, the locking brake is removed from the output, and the housing and output accelerate once again, causing an increase in power consumption shown at 59. Thereafter, as the parts approach rated speed, the power consumption falls as shown by curve 52 to the minimum value 60.

It has been found that omission of any ingredient of the dry lubricant causes a detrimental change in the operation of the clutch as described. Omission of the graphite from the composition causes a chattering of the clutch parts and seizing of the clutch in rigid engagement. Omission of the metal oxide apparently permits glazing of the pads and the inconsistent formation of a film of the graphite and carbon black on the pads and produces temperature sensitivity, thus causing erratic operation of the clutch and a variation in the maximum torque transmitted by the device. The exfoliated vermiculite functions as a vehicle to distribute the other ingredients uniformly throughout the clutch housing and also provides more uniform results in that it functions as an accumulator for traces of oil or water which may be present and as a slight agglomerant, stabilizing film formation. It is believed that the carbon black is an essential ingredient in combination with the graphite, as the graphite is in crystalline form while the carbon black is amorphous. The graphite, when used alone, appears to form an oriented crystalline film on the surface, causing a gradual decrease in the maximum torque available at the output of the clutch. That is, each successive peak 56 in Fig. 4 would be somewhat lower than the preceding peaks. This obviously is undesirable in a clutch designed for transmitting a predetermined torque determined by the power rating of an associated motive means.

The coefficient of friction varies with the proportions of the various ingredients within predetermined ranges, the exact nature of these variations being readily determined by actual test. For example, with the components mixed in the proportions indicated above, the clutch will have a coefficient of friction of .21 with tin oxide as the metal oxide ingredient. If, however, zirconium oxide is employed, the coefficient will be approximately .4. In contrast to this operation, the operation of a typical oil lubricated clutch will exhibit a coefficient of about .1 upon initial actuation or when overloaded, and .35 following nonslipping engagement.

In summary, it will be seen that a coupling apparatus has been provided which utilizes a novel arrangement of a plurality of friction means or clutch elements, said novel design assuring a long coupling life and efficient operation. Also provided for use with the illustrated apparatus is a dry lubricant which assures a consistent maximum torque whereby any strain or sustained overload of the motive means driving the apparatus is obviated. The provided lubricant also enables a higher coefficient of friction to exist between the driving and the driven elements of the coupling device, thereby enabling the transmission of higher limited torques, again preventing strain and overload of the motive means. To protect the bearing of the illustrated apparatus from damage owing to the penetration of the dry lubricant into its annular bearing surface, the novel seal illustrated in Figures 1 and 2 has been provided whereby all penetrating lubricant particles are entrapped in a retaining grease.

Although one embodiment of the coupling apparatus and one lubricant composition has been described in detail, it will be readily apparent that departures may be made from the subject apparatus depicted and the lubricant presented and still remain within the ambit of the inventive concept embodied therein. For instance, asbestos flour (approximately 5–10 percent by weight) may be added to the dry lubricant composition to enable the apparatus to function at higher operating temperature with a substantially constant coefficient of friction. Also, the described composition of carbon black and graphite may vary within a range of ±10 percent, and the particular percentages of the tin or zirconium oxide and the exfoliated vermiculite described may vary ±50 percent, without objectionable reduction in operating characteristics.

It is also contemplated that the lubricant described herein may be utilized in a brake construction. The objectionable "fading" characteristic of conventional friction brakes can be eliminated, thus giving consistent, predictable deceleration under all conditions.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A torque sensitive coupling device comprising a rotatable driving shaft, a coaxial rotatable driven housing partially enclosing said shaft and defining a sealed enclosure, said housing having a pair of opposed convergent generally conic faces extending outwardly from said shaft, a plurality of fly weights maintained in a uniform spaced relationship about said shaft and radially movable relative thereto, each of said weights defining radially convergent surfaces corresponding to the convergent faces of said housing, clutch pad means on said surfaces, the clutch pad means on one of said surfaces being disposed generally along two spaced radials of said shaft, and the clutch pad means on the other of said surfaces being disposed generally along a radial of said shaft intermediate said two spaced radials, and comminuted friction controlling means partially filling said enclosure and adapted to adhere to said pads and form a film of predetermined frictional character.

2. A torque sensitive coupling device comprising a rotatable driving shaft, a coaxial rotatable driven housing partially enclosing said shaft and defining a sealed enclosure, said housing having a pair of opposed convergent generally conic faces extending outwardly from said shaft, a plurality of fly weights maintained in a uniform spaced relationship about said shaft and radially movable relative thereto, each of said weights defining radially convergent surfaces corresponding to the convergent faces of said housing, and clutch pad means on said surfaces, the clutch pad means on one of said surfaces being disposed generally along two spaced radials of said shaft, and the clutch pad means on the other of said surfaces being disposed generally along a radial of said shaft intermediate said two spaced radials.

3. A torque sensitive coupling device comprising a rotatable driven shaft, a coaxial rotatable driven housing partially enclosing said shaft, said housing having a pair of opposed convergent generally conic faces extending outwardly from said shaft, a plurality of pins extending radially from said shaft in equally spaced relationship in said housing, a plurality of fly weights, one weight maintained in radially movable relationship on each of said pins, each of said weights defining radially convergent surfaces corresponding to the convergent faces of said housing, and clutch pad means on said surfaces, the clutch pad means on one of said surfaces being disposed generally along two spaced radials of said shaft, and the clutch pad means on the other of said surfaces being disposed along a radial of said shaft intermediate said two spaced radials.

4. A torque sensitive coupling device comprising a rotatable driving shaft, a co-axial driven housing partially enclosing said shaft, said housing having a pair of opposed convergent generally conic faces extending outwardly from said shaft, a plurality of fly weights disposed in said housing, guide means radially disposed in said housing guiding said fly weight movement in said housing when moving under the influence of centrifugal force in the normal course of housing rotation, clutch pad means on said fly weight surfaces, clutch pad means on one of said surfaces being disposed generally along two spaced radials of said shaft, and the clutch pad means of the other of said surfaces being disposed along a radial of said shaft intermediate said two spaced radials, and dry lubricant means partially filling said housing forming a friction-controlling film on said clutch pads in the course of said radial movement, said dry lubricant means effecting a constant coefficient of friction between said fly weights and housing walls in the normal course of operation.

5. A torque sensitive coupling device comprising a rotatable driving shaft, a coaxial rotatable driven housing partially enclosing said shaft and defining a sealed enclosure, said housing having a pair of opposed convergent generally conic faces extending outwardly from said shaft, a plurality of fly weights maintained in a uniform spaced relation about said shaft within said enclosure and radially movable relative thereto, each of said weights defining radially convergent surfaces corresponding to the convergent surfaces of said housing and having reduced surface area portions projecting from said convergent surfaces, the outermost surfaces of said reduced surface area portions being generally parallel to the fly weight surface from which projecting, said reduced surface area portions comprising fly weight pivot means engaging said housing conic faces in the course of said fly weight radial movement from said driving shaft and assuring snug engagement between said weights and said housing conic surfaces.

6. In a torque sensitive coupling device in which friction alone is employed in the coupling operation the combination comprising a rotatable driving shaft, a coaxial rotatable driven housing partially enclosing said shaft and defining a sealed enclosure, fly weight means supported by said shaft within said encloseure and radially shiftable relative thereto into engagement with said housing, clutch pad means secured to said fly weight means and intermediate said fly weight means and said housing, said clutch pad means comprising pivot means for said fly weight means enabling said fly weight means to adjust in the course of their radial movement and securely engage said housing, comminuted friction controlling material partially filling said enclosure for controlling the coefficient of friction between said clutch pad means and said housing in the normal course of operation, said comminuted friction controlling material establishing a substantially constant film on said clutch pad means thereby effecting a generally constant coefficient of friction between said fly weight means when shifted radially in said housing.

7. A torque sensitive coupling device comprising a rotatable driving shaft, a coaxial rotatable driven housing partially enclosing said shaft and defining a sealed enclosure, said housing having a pair of opposed convergent generally conic surfaces extending outwardly from said shaft, a plurality of fly weights disposed in said housing uniformly spaced about said driving shaft and radially movable relative thereto, clutch pad means disposed on opposed surfaces of each of said fly weights, said clutch pad means defining radially convergent surfaces centrifugally urged into engagement with said housing conic surfaces, comminuted friction controlling material disposed within said enclosure forming a lubricating film on said clutch pad means between said fly weights and housing conic surfaces, and comminuted agglomerant means within said housing intermixed with said friction controlling material for disintegrating said film and removing said film from said clutch pad means whenever said fly weigths are rotated relative to said housing conic surfaces whereby said comminuted friction controlling material and agglomerant means are urged radially outwardly in said housing.

8. A torque sensitive coupling device comprising a rotatable driving shaft, a coaxial rotatable driven housing partially enclosing said shaft and defining a sealed enclosure, said housing having a pair of opposed convergent generally conic surfaces extending outwardly from said shaft, a plurality of fly weights disposed in said housing uniformly spaced about said driving shaft and radially movable relative thereto, clutch pad means disposed on opposed surfaces of each of said fly weights, said clutch pad means defining radially convergent surfaces corresponding to the convergent surfaces of said housing, said housing having a peripheral space radially outward beyond said fly weights, comminuted friction controlling material disposed within said enclosure forming a lubricating film on said clutch pad means between said fly weights and housing conic surfaces, and comminuted agglomerant means within said housing intermixed with said friction controlling material for disintegrating said film and removing said film from said clutch pad means whenever said fly weights are rotated relative to said housing conic surfaces whereby said comminuted friction controlling material and agglomerant means are urged radially outwardly in said housing, quantities of said comminuted friction controlling material and comminuted agglomerant means accumulating in said housing peripheral space whenever said housing is rotating.

References Cited in the file of this patent

UNITED STATES PATENTS

| | | |
|---|---|---|
| 1,271,424 | Brush | July 2, 1918 |
| 1,449,608 | Judd | Mar. 27, 1923 |
| 1,519,268 | Schnell | Dec. 16, 1924 |
| 1,622,261 | Payne | Mar. 22, 1927 |
| 1,659,286 | Wallace | Feb. 14, 1928 |
| 1,910,270 | Whiteside | May 23, 1933 |
| 2,177,853 | Wills | Oct. 31, 1939 |
| 2,366,729 | Hanson | Jan. 9, 1945 |
| 2,417,351 | Covington | Mar. 11, 1947 |
| 2,519,449 | Findley | Aug. 22, 1950 |
| 2,635,902 | Hornschuch | Apr. 21, 1953 |
| 2,738,044 | Winther | Mar. 13, 1956 |
| 2,757,138 | Clatot | July 31, 1956 |

FOREIGN PATENTS

| | | |
|---|---|---|
| 472,909 | Germany | Mar. 1, 1929 |
| 813,293 | France | Feb. 22, 1937 |